March 15, 1932.  S. AMICO  1,849,738
COVER OR PROTECTOR FOR VEHICLES AND THE LIKE
Filed June 18, 1931  2 Sheets-Sheet 1

Inventor
S. Amico.
By L. F. Randolph Jr.
Attorney

March 15, 1932. S. AMICO 1,849,738
COVER OR PROTECTOR FOR VEHICLES AND THE LIKE
Filed June 18, 1931 2 Sheets-Sheet 2

Inventor
S. Amico.
By L. F. Randrupt Jr.
Attorney

Patented Mar. 15, 1932

1,849,738

UNITED STATES PATENT OFFICE

SEBASTIANO AMICO, OF PITTSTON, PENNSYLVANIA

COVER OR PROTECTOR FOR VEHICLES AND THE LIKE

Application filed June 18, 1931. Serial No. 545,284.

The invention relates to covers or protectors for automobiles and other vehicles and the like and has for its object the provision of a collapsible canopy to be lowered over the vehicle while standing in a garage or storage to protect it from dust, the canopy being mounted for movement on a track, and the track mounted for movement on a support, so that the canopy may be quickly and readily positioned over the vehicle, and making it unnecessary to position the vehicle relatively to the canopy.

Figure 1:
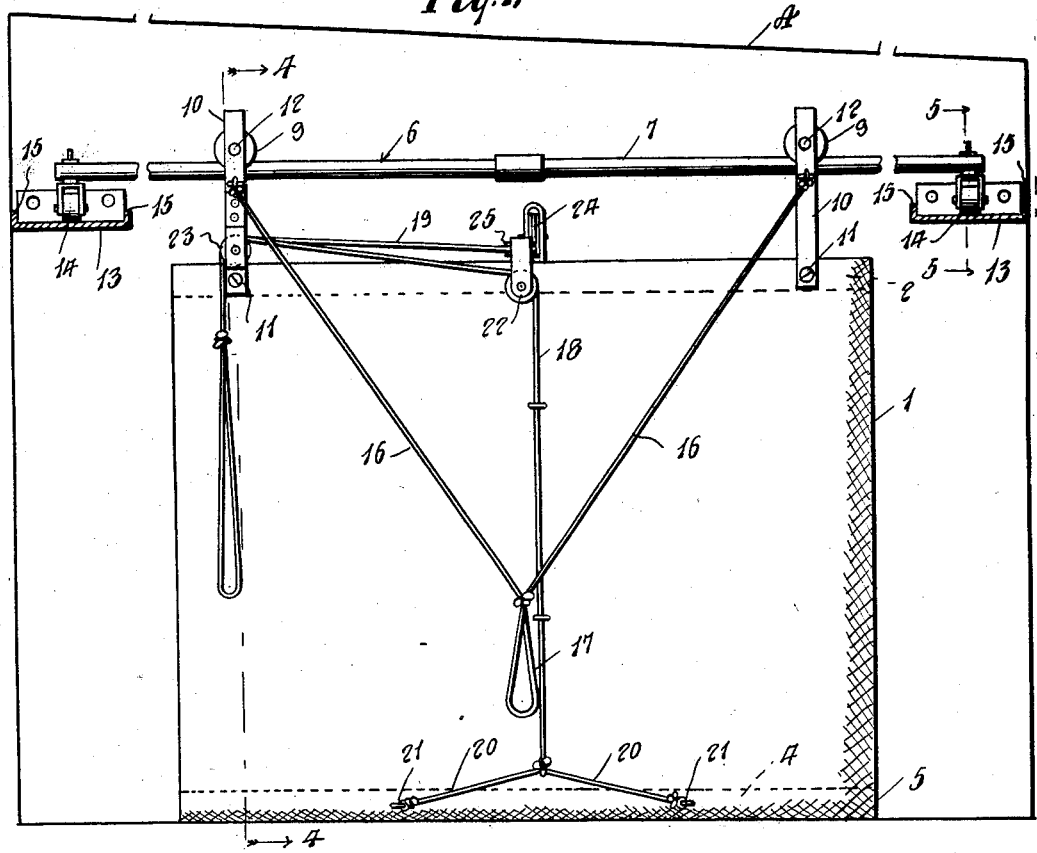
Figure 2:
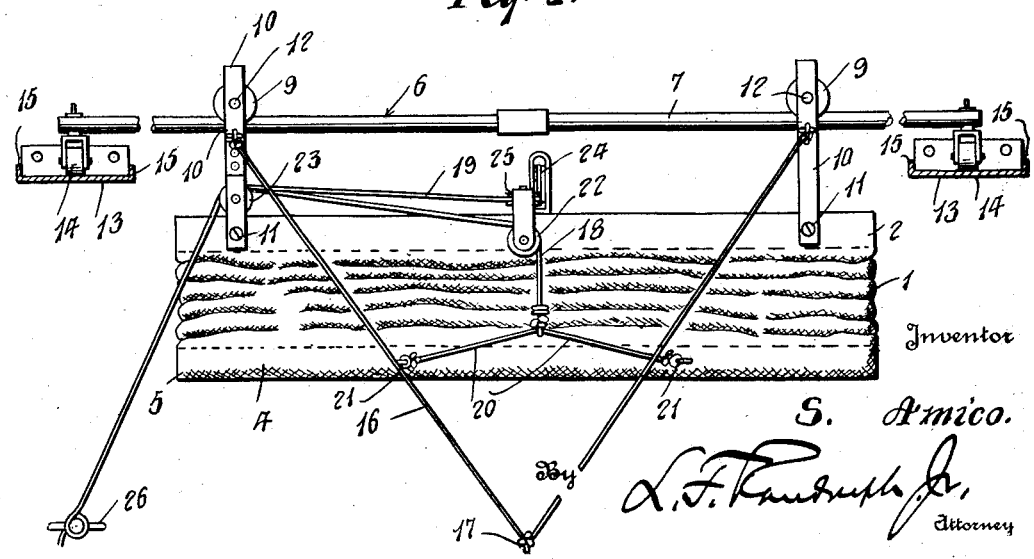
Figure 3:
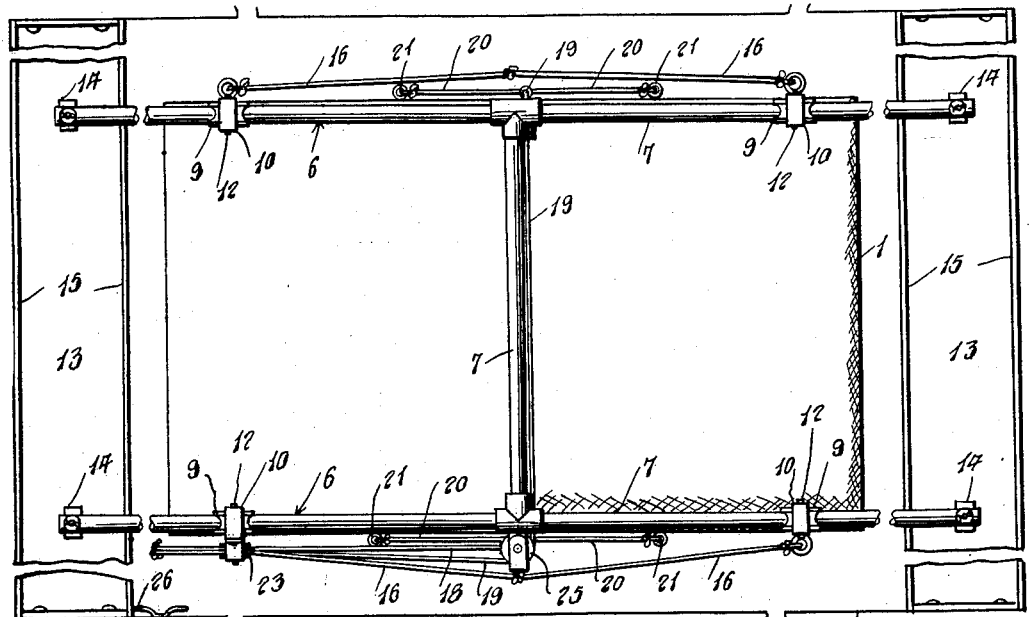
Figure 4:
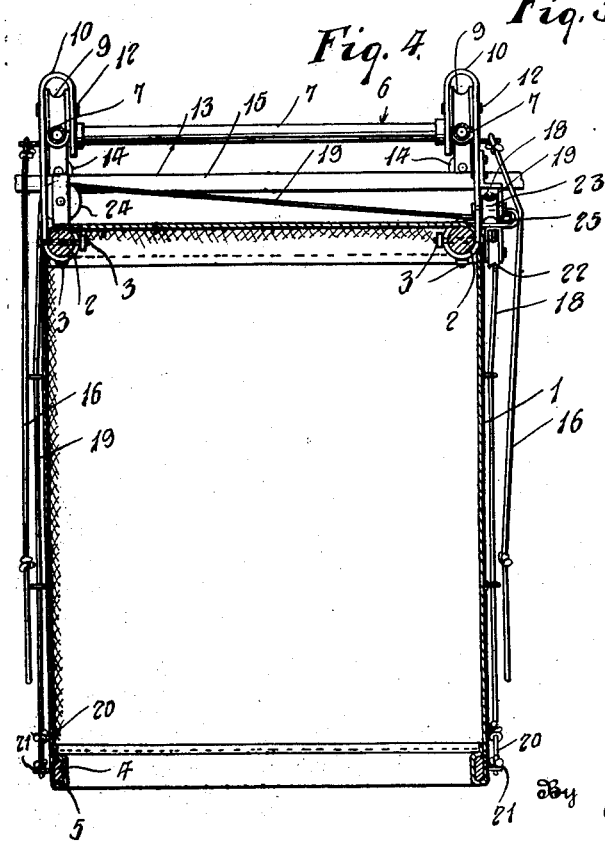
Figure 5:
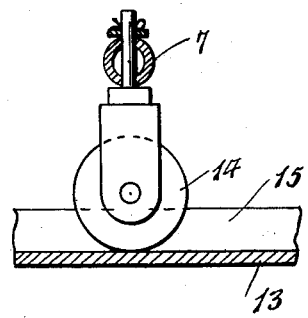

The invention will be described in detail hereinafter and will be found illustrated in the accompanying drawings, in which Figure 1 is a side view in elevation of the improved protector or cover in lowered position showing the supporting means for the track in section, the garage or storage room in which the device is contained being indicated diagrammatically, Figure 2 is a similar view of the canopy and supporting members, the garage or storage room being omitted, and showing the canopy in a raised or collapsed position, Figure 3 is a top plan view, Figure 4 is a transverse sectional view on a plane indicated by the line 4—4 of Figure 1, and Figure 5 is a fragmentary view partly in section on the plane indicated by the line 5—5 of Figure 1.

In the drawings similar reference characters are used to designate corresponding parts in all of the views.

The canopy or protecting cover 1 is made of canvas or other suitable fabric permitting folding or collapsing of the canopy when not in use as a cover, as shown in Figure 2. The canopy is held in shape by means of a shaping ring 2 secured thereto by means of bolts 3 or other suitable means, and 4 is a weighted ring secured in the hem 5 in the lower edge of the canopy or cover.

6 indicates a track consisting of two rails that may be made of any suitable material such as tubes 7 and connected together and spaced from one another by means of a cross rail 8. The canopy 1 is suspended for movement along the track 6 by means of wheels or rollers 9 that are preferably of a grooved periphery type to fit the rails 7, said wheels or rollers 9 being journaled on hangers 10 secured to the cover or canopy 1 to the ring 2 as shown at 11, 12 indicating the journals of the wheels or rollers 9.

The ends of the rails 7 are supported on shelves 13 in the garage or other enclosure A by means of swiveled rollers or casters 14, so that the track 6 may be moved transversely of the garage or enclosure A and also moved at an angle to the walls thereof to position the track over the vehicle to be covered, and then the canopy may be moved into proper position to be lowered over the vehicle this making it unnecessary to position the vehicle relatively to the canopy when parking the car or other vehicle. The shelves 13 are provided with upstanding flanges 15 to prevent the casters 14 from rolling off of the shelves in adjusting the track 6 as herein above stated.

On each side of the canopy is provided a rope 16 having its ends secured to the hangers on the corresponding sides of the canopy, the intermediate portion of the rope hanging down and may be knotted into a loop 17 as best illustrated in Figure 1. The ropes 16 are designed to provide means for conveniently shifting the canopy on the track and the track on the shelves to adjust the protector or cover in proper position over the car as above described. 18 and 19 indicate other ropes or flexible members for raising and lowering the canopy, each of these ropes being secured to loops 20 intermediate of fastening means 21 at the lower portion of the protector or canopy, and preferably connected to the weighted ring 4. The rope 18 is trained over a pulley 22 and 23, while the rope 19 is trained over pulleys 24, 25, and 23 and the free end thereof may be secured on a clear 26 when the canopy is in a raised or collapsed position as best shown in Figure 2.

What is claimed is:—

1. In a protecting device of the character described, a canopy of flexible material, a track for mounting said canopy, wheels secured to said canopy and mounted on said track, and means movably supporting the ends of said track and permitting movement thereof relatively to each other to position the canopy over an object to be covered and protected.

2. In a protecting device of the character described, a canopy of flexible material, wheels secured to said canopy, a track mounting said wheels, shelves suitably supported, and casters on the ends of said tracks and mounted on said shelves and providing for movement of the track and canopy to position over an object to be covered and protected.

3. A protecting device of the character described, comprising shelves suitably supported and spaced from one another, a track, casters on the ends of said track and mounted on said shelves, upstanding flanges on the shelves to hold the casters thereon, a canopy, wheels on said canopy and mounted on said track, said canopy being movable on the track and the track on the shelves to position the canopy over an object to be covered and protected, a weighted ring secured to the open edge of said canopy to normally lower it, and flexible elements secured to said ring and operable to lift the ring and collapse said canopy.

In testimony whereof I affix my signature.

SEBASTIANO AMICO.